DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 10

T949,010
BLOCK-STRUCTURED UNSATURATED COPOLYESTER COMPOSITIONS

John R. Dombroski, Rte. 13, 5608 Cheyenne Trail, Kingsport, Tenn. 37664

Filed Sept. 22, 1975, Ser. No. 615,614
Int. Cl.[2] C08G *63/52*
U.S. Cl. 260—75 VA
No Drawing. 10 Pages Specification

This invention relates to an improved two-stage process for the synthesis of resinous compositions, useful in reinforced plastics applications, that utilize 2,2,4-trimethyl-1,3-pentanediol as the major glycol component the unsaturated polyester. In particular, this invention is concerned with the discovery that polyesters prepared by means of this novel process result in a more ordered arrangement of components in the polyester backbone and thus exhibit an unexpected improvement in the crosslinking cure rate and enhanced physical properties in the cured state.